(12) United States Patent
Nakamura

(10) Patent No.: US 10,958,881 B2
(45) Date of Patent: *Mar. 23, 2021

(54) OPTICAL MODULE, METHOD FOR CONTROLLING THE SAME, AND PROJECTION-TYPE DISPLAY APPARATUS

(71) Applicant: SEIKO EPSON CORPORATION, Tokyo (JP)

(72) Inventor: Norio Nakamura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/825,139

(22) Filed: Mar. 20, 2020

(65) Prior Publication Data

US 2020/0304762 A1  Sep. 24, 2020

(30) Foreign Application Priority Data

Mar. 22, 2019  (JP) .............................. JP2019-054297

(51) Int. Cl.
*H04N 9/31* (2006.01)
*G02B 26/08* (2006.01)

(52) U.S. Cl.
CPC ......... *H04N 9/312* (2013.01); *G02B 26/0875* (2013.01); *H04N 9/315* (2013.01); *H04N 9/3111* (2013.01)

(58) Field of Classification Search
CPC .................. H04N 9/312; G02B 26/0875
See application file for complete search history.

(56) References Cited

U.S. PATENT DOCUMENTS

| | | |
|---|---|---|
| 6,793,351 B2 | 9/2004 | Nelson et al. |
| 7,918,560 B2 | 4/2011 | Miyazawa |
| 9,091,910 B2 | 7/2015 | Koyama |
| 9,097,907 B2 | 8/2015 | Endo et al. |
| 9,250,507 B2 | 2/2016 | Narimatsu et al. |
| 9,860,499 B2 | 1/2018 | Mizoguchi |
| 9,900,565 B2 | 2/2018 | Miyasaka |

(Continued)

FOREIGN PATENT DOCUMENTS

| | | |
|---|---|---|
| JP | H04-063332 A | 2/1992 |
| JP | 2019-053241 A | 4/2019 |

OTHER PUBLICATIONS

Oct. 16, 2020 Notice of Allowance Issued in U.S. Appl. No. 16/825,156.

*Primary Examiner* — Michael E Teitelbaum
(74) *Attorney, Agent, or Firm* — Oliff PLC

(57) ABSTRACT

An optical module includes a light modulator that modulates light and includes a plurality of pixels, and a pixel shift mechanism. The light modulator is driven based on an interlace method. The pixels of the light modulator each include a first sub-pixel on which a first color light flux or a second color light flux is incident, a second sub-pixel on which a color light flux different from the color light flux incident on the first sub-pixel out of the first color light flux and the second color light flux is incident, and a third sub-pixel and a fourth sub-pixel on which a third color light flux is incident. The third sub-pixel and the fourth sub-pixel are arranged in a scan direction of the light modulator. The pixel shift mechanism shifts the light modulator in a direction that intersects the scan direction.

11 Claims, 14 Drawing Sheets

(56) References Cited

U.S. PATENT DOCUMENTS

| | | |
|---|---|---|
| 10,345,690 B2 | 7/2019 | Nagumo |
| 10,460,637 B2 | 10/2019 | Ohkoba |
| 10,564,528 B2 | 2/2020 | Kodama et al. |
| 2005/0099534 A1* | 5/2005 | Aufranc, Jr. ........... G09G 3/002 348/428.1 |
| 2014/0313448 A1 | 10/2014 | Kinoe |

* cited by examiner

FIG. 4

| SHIFT POSITION | | P1 | P2 | P3 | P4 |
|---|---|---|---|---|---|
| SUB-PIXEL | 11 | R3 | R4 | R1 | R2 |
| | 12 | B4 | B3 | B2 | B1 |
| | 13 | G1 | G2 | G3 | G4 |
| | 14 | G2 | G1 | G4 | G3 |

FIG. 6

TWO-AXIS-SHIFT/FOUR-VALUE NON-INTERLACE

OPTICAL MODULE, METHOD FOR CONTROLLING THE SAME, AND PROJECTION-TYPE DISPLAY APPARATUS

The present application is based on, and claims priority from JP Application Serial Number 2019-054297, filed Mar. 22, 2019, the disclosure of which is hereby incorporated by reference herein in its entirety.

BACKGROUND

1. Technical Field

The present disclosure relates to an optical module, a method for controlling the same, and a projection-type display apparatus.

2. Related Art

JP-A-4-63332 discloses a single-plate projector using one liquid crystal panel as a light modulator. The projector includes a liquid crystal panel for polarization direction control that functions as a pixel shift mechanism that shifts the optical path of video image light having passed through the liquid crystal panel to shift the position of each pixel projected on a screen. The liquid crystal panel for polarization direction control shifts the optical path in a predetermined direction by switching applied voltage from ON to OFF and vice versa. Pixel shift that moves the pixel position of each pixel projected on the screen is thus performed.

In JP-A-4-63332, an image signal representing pixels the number of which is greater than the number of pixels of the liquid crystal panel is broken down into a plurality of image signals, which are then displayed in a time division manner in synchronization with the shift operation. For example, to perform pixel shift that shifts the pixels by half the pixel interval in one direction (such as horizontal direction or 45-degree oblique direction), an image displayed in the form of one frame is broken down into two images, which are switched from one to the other in synchronization with the shift operation. On the other hand, to perform pixel shift that shifts the pixels by half the pixel interval in two directions (horizontal and vertical directions), an image displayed in the form of one frame is broken down into four images, and the displayed image is switched from one of the four images to another in synchronization with the shift operation because the combination of the shift directions creates four shift positions. As a result, since the image displayed on the screen is switched from one of the four images to another in synchronization with the pixel shift using pixel shift interval smaller than the pixel interval, the apparent number of pixels can be increased, whereby the resolution of the image projected on the screen can be increased.

When the resolution is increased by the pixel shift, discrepancy between the timing of rewriting of the pixels of the liquid crystal panel used as the light modulator and the timing of the shift operation causes discrepancy between the sub-pixel-displaying content displayed on the screen and the display content to be originally displayed, resulting in asynchronization between the shift position and the display content and therefore a decrease in display quality. For example, when the liquid crystal panel, which is the light modulator, is driven based on the non-interlace method (progressive method), in which the pixels that form one frame are successively rewritten from the top of the screen to the bottom thereof, discrepancy between the shift position and the display content occurs between the beginning of rewriting of one frame to the end thereof. For example, when the shift position is synchronized with the display content in the beginning of rewriting of one frame, the discrepancy between the shift position and the display content is more likely to occur in a position closer to the end of the rewriting of one frame. The asynchronization between the display content and the shift position is therefore likely to occur in a display area rewritten at the end of the rewriting, so that the asynchronization is likely to be sensed as in-plane unevenness, and the display quality is likely to lower.

SUMMARY

An optical module according to the present disclosure is an optical module including a light modulator that modulates light incident thereon on a pixel basis and a pixel shift mechanism. The light modulator is driven based on an interlace method. The pixels of the light modulator each include a first sub-pixel on which a first color light flux or a second color light flux is incident, a second sub-pixel on which a color light flux different from the color light flux incident on the first sub-pixel out of the first color light flux and the second color light flux is incident, and a third sub-pixel and a fourth sub-pixel on which a third color light flux is incident. The third sub-pixel and the fourth sub-pixel are arranged in a scan direction of the light modulator. The pixel shift mechanism shifts a position on which video image light modulated by the light modulator is incident in a direction that intersects the scan direction.

A projection-type display apparatus according to the present disclosure includes the optical module described above and a projection optical system that enlarges and projects the video image light incident from the optical module.

An optical module controlling method according to the present disclosure is a method for controlling an optical module including a light modulator that modulates light incident thereon on a pixel basis and a pixel shift mechanism. The pixels of the light modulator each include a first sub-pixel on which a first color light flux or a second color light flux is incident, a second sub-pixel on which a color light flux different from the color light flux incident on the first sub-pixel out of the first color light flux and the second color light flux is incident, and a third sub-pixel and a fourth sub-pixel on which a third color light flux is incident. The method includes driving the light modulator based on an interlace method with a direction in which the third sub-pixel and the fourth sub-pixel are arranged being a scan direction and shifting a position on which video image light modulated by the light modulator is incident in a direction that intersects the scan direction.

BRIEF DESCRIPTION OF THE DRAWINGS

FIG. 4 shows data corresponding to one frame in accordance with which the pixels are rewritten.

FIG. 6 is a descriptive diagram showing the distribution of the locations where the asynchronization occurs in Comparative Example 1.

FIG. 13 is a descriptive diagram showing the distribution of the locations where the asynchronization occurs in the third embodiment.

FIG. 14 is a descriptive diagram showing the distribution of the locations where the asynchronization occurs in Comparative Example 3.

DESCRIPTION OF EXEMPLARY EMBODIMENTS

First Embodiment

Figure 1:
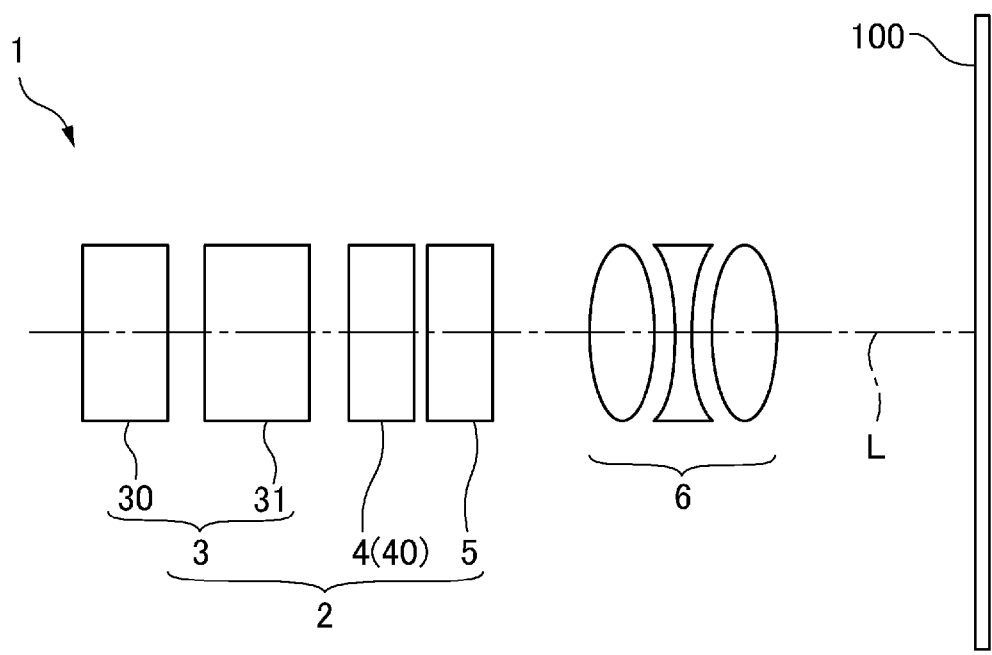
FIG. 1 is a descriptive diagram showing the optical configuration of a projector that is an example of a projection-type display apparatus including an optical module according to a first embodiment.

An exemplary embodiment of the present disclosure will be described below with reference to the drawings. FIG. 1 is a descriptive diagram showing the optical configuration of a projector 1, which is an example of a projection-type display apparatus including an optical module 2 according to a first embodiment. The projector 1 is an apparatus that displays video images on a screen 100 based on an externally inputted video signal. The projector 1 includes the optical module 2 and a projection optical system 6. The optical module 2 includes a light source section 3, a light modulator 4 and a pixel shift mechanism 5. The projector 1 shown in FIG. 1 is what is called a single-plate projector in which one light modulator 4 modulates three color light fluxes, R light (red light), G light (green light), and B light (blue light). In the present specification, the R light (red light) is a first color light flux, the B light (blue light) is a second color light flux, and the G light (green light) is a third color light flux.

The light source section 3 includes a light source 30, which outputs the R light, the G light, and the B light, and an optical system 31, which causes the R light, the G light, and the B light outputted from the light source 30 to be incident on each pixel of the light modulator 4. The light source 30 is, for example, a laser light source, such as a semiconductor laser. The light source 30 may have a configuration different from the configuration of a laser light source. For example, dichroic mirrors that selectively reflect the R light, the G light, and the B light, color filters that selectively transmit the R light, the G light, and the B light, and other optical elements and a white light source may be used to output the R light, the G light, and the B light.

The light modulator 4, specifically, each pixel 10 thereof modulates the R light, the G light, and the B light outputted from the light source section 3 in accordance with image information to produce full-color video image light L. In the first embodiment, the light modulator 4 is a transmissive liquid crystal panel 40. The video image light L outputted from the light modulator 4 enters the projection optical system 6 via the pixel shift mechanism 5, and the projection optical system 6 enlarges the video image light L and projects the enlarged video image light L on the screen 100.

Figure 2:
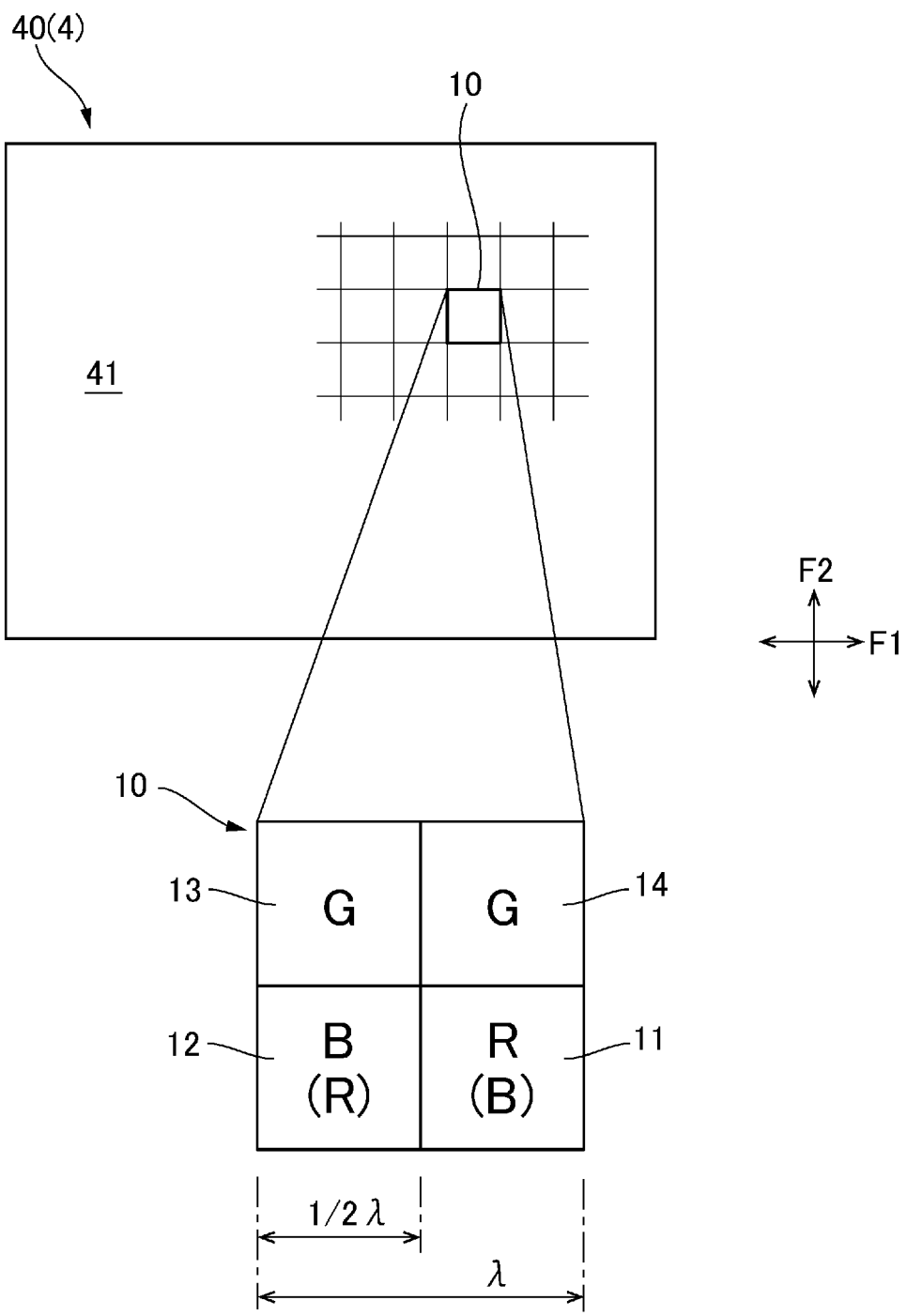
FIG. 2 is a descriptive diagram diagrammatically showing the planar configuration of a liquid crystal panel and pixels thereof in the first embodiment.

FIG. 2 is a descriptive diagram diagrammatically showing the planar configuration of the liquid crystal panel 40 and the pixels 10 in the first embodiment. The pixels 10 are arranged in a matrix in a display area 41 of the liquid crystal panel 40. In FIG. 2, the pixels 10 are displayed at a scale greater than the actual scale. The pixels 10 each include four sub-pixels arranged in two directions, two sub-pixels arranged in a first direction F1, which is the scan direction of the liquid crystal panel 40, and two sub-pixels arranged in a second direction F2, which is perpendicular to the first direction F1. The pixels 10 each include a first sub-pixel 11, a second sub-pixel 12, a third sub-pixel 13, and a fourth sub-pixel 14, as shown in FIG. 2.

The four sub-pixels that form each of the pixels 10 receive the R light, the G light, and the B light as follows: One of the R light and the B light is incident on the first sub-pixel 11. Out of the R light and the B light, the color light flux different from the color light flux incident on the first sub-pixel 11 is incident on the second sub-pixel 12. The first embodiment will be described with reference to a configuration in which the R light is incident on the first sub-pixel 11 and the B light is incident on the second sub-pixel 12. Instead, a configuration in which the B light is incident on the first sub-pixel 11 and the R light is incident on the second sub-pixel 12 may be employed.

The G light is incident on the third sub-pixel 13 and the fourth sub-pixel 14. The third sub-pixel 13 and the fourth sub-pixel 14, on which the G light is incident, are arranged in the first direction F1, which is the scan direction of the liquid crystal panel 40.

The liquid crystal panel 40 includes an array of microlenses arranged at the same interval as a pixel interval λ in the liquid crystal panel 40. The R light, the G light, and the B light incident on the microlens array at angles different from one another are collected and directed to the respective sub-pixels in each of the pixels 10 of the light modulator 4.

The pixel shift mechanism 5 is disposed between the light modulator 4 and the projection optical system 6. The pixel shift mechanism 5 shifts the position where the video image light L outputted from the light modulator 4 is projected on the screen 100 (performs what is called pixel shift). The pixel shift mechanism 5 is, for example, a mechanism that shifts the optical path of the video image light L based on refraction by changing the attitude of an actuator-driven light transmissive substrate that transmits the video image light L, such as a glass plate.

In the present embodiment, the pixel shift mechanism 5 shifts the optical path of the video image light L in the first direction F1 and the second direction F2 perpendicular to the first direction F1. The shift operation therefore causes the pixels 10 to be shifted in the first direction F1 and the second direction F2 and displayed on the screen 100. Pixel shift by an amount smaller than a pixel interval Aλ on the screen 100, which is the product of the pixel interval λ in the liquid crystal panel 40 and a projection magnification A, allows an increase in the resolution of the full-color display image displayed on the screen 100.

The pixel shift mechanism 5 includes a mechanism that swings the light transmissive substrate that transmits the video image light L around a predetermined axial line as the mechanism that shifts the optical path in the first direction F1 and the second direction F2. For example, to shift the optical path in the first direction F1, the light transmissive substrate is swung around a first axial line perpendicular to the first direction F1. To shift the optical path in the second direction F2, the light transmissive substrate is swung around a second axial line perpendicular to the second direction F2.

The pixel shift mechanisms does not necessarily have the configuration described above. For example, the pixel shift mechanism 5 may instead be configured to electrically change the state of refraction performed by an optical element that transmits the video image light L. A panel shift mechanism can still instead be used. In this case, a piezo-electric actuator, a stepper motor, or any other actuator is used to perform panel shift operation of moving the liquid crystal panel 40 itself in a pixel shift direction to shift the position where the video image light L is projected on the screen 100.

Figure 3:
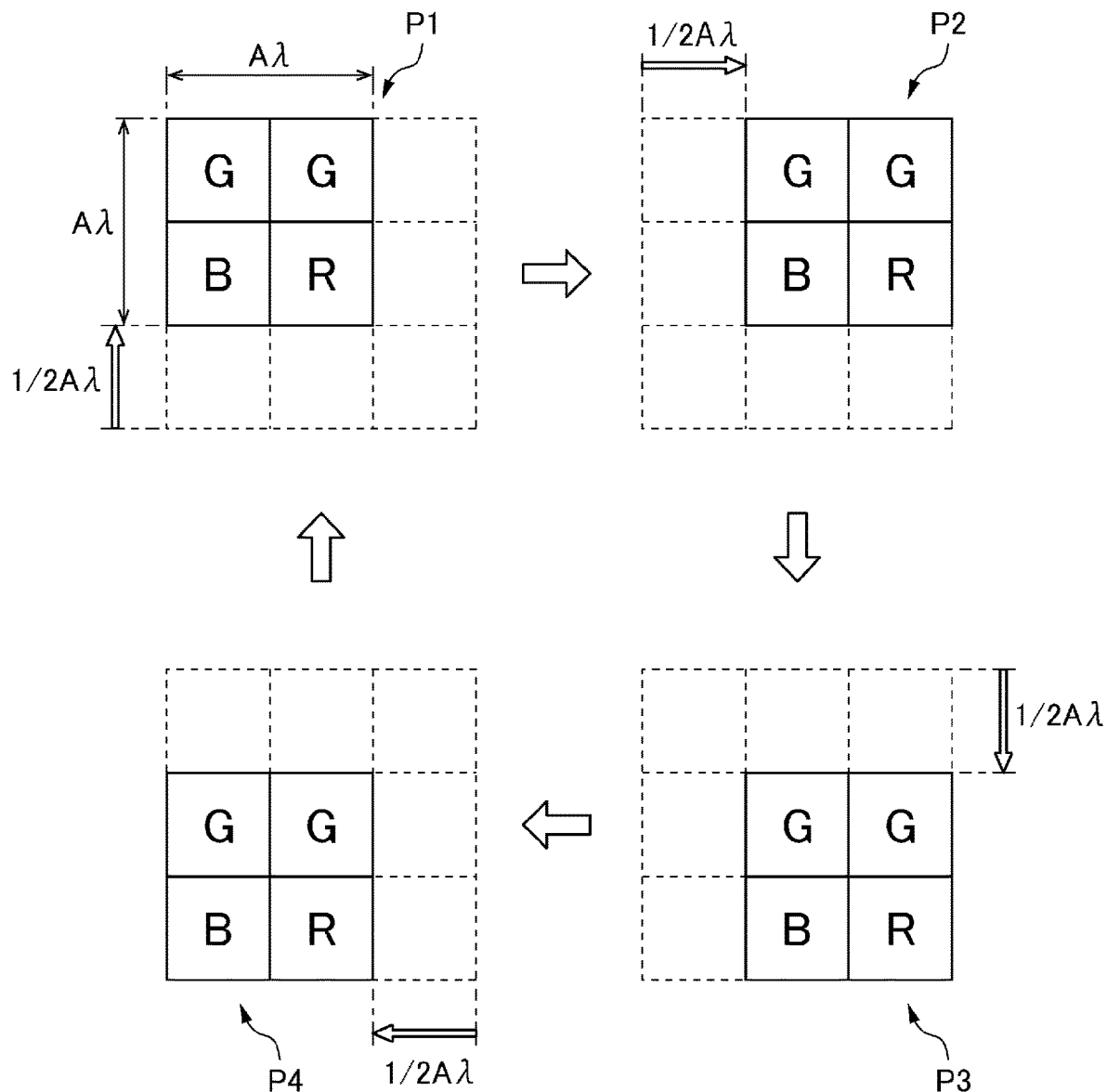
FIG. 3 is a state transition diagram showing pixel shift in the first embodiment.

FIG. 3 is a state transition diagram showing the pixel shift in the first embodiment. A first shift position P1, a second shift position P2, and a third shift position P3 shown in FIG. 3 are on-projection-surface positions where the video image light L is projected and are, in the present embodiment, positions on the screen 100 that are the positions where the video image light L modulated by the pixels 10 is projected. As shown in FIG. 2, the pixel interval on the screen 100 is $A\lambda$, where the pixel interval in the liquid crystal panel 40 is $\lambda$, and the projection magnification in the projection on the screen 100 is A. As shown in FIG. 3, the light fluxes modulated by the sub-pixels of each of the pixels 10 of the liquid crystal panel 40 are sequentially projected on four shift positions on the screen 100 in accordance with the pixel shift in the first direction F1 and the second direction F2. The four shift positions are the first shift position P1, the second shift position P2, which is shifted by $\frac{1}{2}A\lambda$ from the first shift position P1 in the first direction F1, the third shift position P3, which is shifted by $\frac{1}{2}A\lambda$ from the second shift position P2 in the second direction F2, and a fourth shift position P4, which is shifted by $\frac{1}{2}A\lambda$ from the third shift position P3 in the first direction F1. The fourth shift position P4 is shifted by $\frac{1}{2}A\lambda$ from the first shift position P1 in the second direction F2.

The optical module 2 performs the pixel shift once in the following order in a one-frame display period in which the display screen of the liquid crystal panel 40 is rewritten once: the first shift position P1→the second shift position P2→the third shift position P3→the fourth shift position P4. The shift position movement is therefore performed in the cycle that is a quarter of the one-frame rewriting cycle. For example, to display an image formed of 60 frames per second, the shift position movement is performed 240 times per second.

In the first embodiment, pixel shift in which the shift operation is performed in two directions and the number of shift positions is four (hereinafter, two-axis-shift/four-value pixel shift) is performed. As a result, all the color light fluxes, the R light, the G light, and the B light, are projected on the screen 100 in the areas where the pixel interval is half the pixel interval $A\lambda$, which is the product of the pixel interval $\lambda$ in the liquid crystal panel 40 and the projection magnification A, in a time division manner in the one-frame display period. The resolution in the first direction F1 and the resolution in the second direction F2 can therefore be apparently doubled.

Method for Driving Liquid Crystal Panel

In the optical module 2 according to the first embodiment, the liquid crystal panel 40 is driven based on the interlace method. That is, to rewrite the pixels 10 arranged in the display area 41, the pixels in every other row are sequentially rewritten instead of successive rewriting of the pixels in a row from above to below. In the first embodiment, in which the pixels 10 each have upper and lower two rows of sub-pixels arranged in the scan direction (first direction F1), one frame is rewritten by rewriting every other sub-pixel row. For example, the odd-number sub-pixel rows out of all the pixels are first rewritten, and then the even-number sub-pixel rows out of all the pixels are then rewritten.

FIG. 4 shows data corresponding to one frame in accordance with which the pixels 10 are rewritten. In FIG. 4, G1, G2, G3, and G4 represent data for modulation of the G light. R1, R2, R3, and R4 represent data for modulation of the R light, and B1, B2, B3, and B4 represent data for modulation of the B light. As shown in FIG. 4, the first sub-pixel 11 is rewritten in synchronization with the pixel shift that goes through the four shift positions as follows: R3→R4→R1→R2. The second sub-pixel 12 is rewritten as follows: B4→B3→B2→B1. The third sub-pixel 13 is rewritten as follows: G1→G2→G3→G4. The fourth sub-pixel 14 is rewritten as follows: G2→G1→G4→G3.

Figure 5:
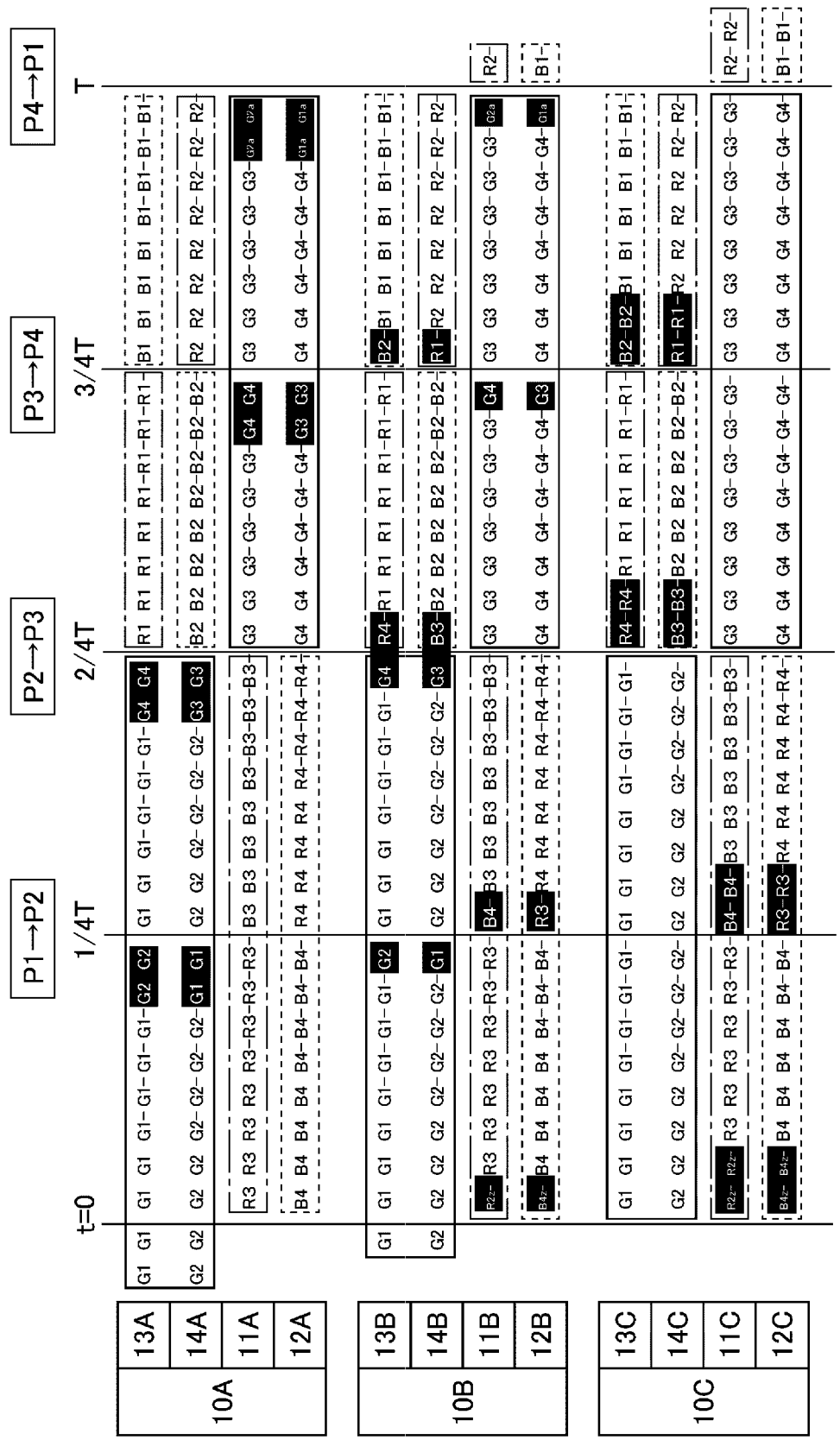
FIG. 5 is a descriptive diagram showing the distribution of the locations where asynchronization occurs in the first embodiment.

FIG. 5 is a descriptive diagram showing the distribution of the locations where the asynchronization occurs in the first embodiment. The sequence of the data shown in FIG. 5 shows that the display contents are rewritten on a sub-pixel basis in three pixel positions 10A, 10B, and 10C on the screen 100 in the rewriting of the data corresponding to one frame shown in FIG. 4 in synchronization of the shift operation. The pixel position 10A is a pixel position at the upper end of the screen, the pixel position 10B is a pixel position at the center of the screen, and the pixel position 10C is a pixel position at the lower end of the screen. The timings t=0, $\frac{1}{4}T$, $\frac{2}{4}T$, $\frac{3}{4}T$, and T are shift operation timings. T represents the cycle in which one frame is rewritten.

In FIG. 5, the data for modulation of the G light are surrounded by the solid lines for ease of illustration of the data. The data for modulation of the B light are surrounded by the broken lines, and the data for modulation of the R light are surrounded by the one dot chain lines. In FIG. 5, the sign—attached to data represents that the polarity of the data is reversed. The reason for this is that polarity-reversed data are successively written to keep the polarity balance in the actual data rewriting. For example, to write data G1, polarity-reversed data (G1−) are successively written.

In FIG. 5, the reference characters 11A, 12A, 13A, and 14A represent the four sub-pixel positions in the pixel position 10A at the upper end of the screen. The sub-pixel positions 11A, 12A, 13A, and 14A are the positions where light fluxes modulated at the first sub-pixel 11, the second sub-pixel 12, the third sub-pixel 13, and the fourth sub-pixel 14 are projected, provided that the pixel position 10A is the first shift position P1 shown in FIG. 3. Similarly, the reference characters 11B, 12B, 13B, and 14B represent the four sub-pixel positions in the pixel position 10B at the center of the screen, and the reference characters 11C, 12C, 13C, and 14C represent the four sub-pixel positions in the pixel position 10C at the lower end of the screen.

In the first embodiment, in which the liquid crystal panel 40 is driven based on the interlace method, the pixels 10 are so rewritten that the third sub-pixel 13 and the fourth sub-pixel 14, which are the sub-pixels in the upper row of the two rows in which the sub-pixels are arranged in the first direction F1, are first rewritten. In the rewriting of one frame, the third sub-pixel 13 and the fourth sub-pixel 14 of all the pixels 10 are rewritten, and the first sub-pixel 11 and the second sub-pixel 12 of all the pixels 10 are then rewritten. Since the third sub-pixel 13 and the fourth sub-pixel 14 are the sub-pixels on which the G light is incident, the sub-pixel row on which the G light is incident is rewritten in the first half of the interlace drive operation, and the sub-pixel row on which the R light and the B light are incident is rewritten in the second half of the interlace drive operation.

In FIG. 5, reverse display data show the locations where asynchronization between the shift position and the display content occurs. The asynchronization between the shift position and the display content occurs more frequently in a period separate by a greater length of time from the timing at which the shift position is synchronized with the display content. In the first embodiment, the shift operation is synchronized with the display content at the timing of rewriting in the pixel position 10B at the center of the screen.

In the interlace method, every other row of the entire screen is rewritten, and the remaining rows are then rewritten, so that asynchronization experiencing sub-pixel positions are distributed across the screen 100. For example, in the case of the G-light sub-pixel positions, where the display contents are rewritten in the first half of the one-frame rewriting process, the locations where the asynchronization occurs do not concentrate in the pixel position 10A at the upper end, but the locations where the asynchronization occurs are distributed in the G-light sub-pixel positions in the pixel position 10A at the upper end and the pixel position 10B at the center. In the case of the R-light sub-pixel positions and the B-light sub-pixel positions, where the display contents are rewritten in the second half of the one-frame rewriting process, the locations where the asynchronization occurs do not concentrate in the pixel position 10C at the lower end, but the locations where the asynchronization occurs are distributed in the R-light sub-pixel positions and the B-light sub-pixel positions in the pixel position 10C at the lower end and the pixel position 10B at the center.

Figure 6:
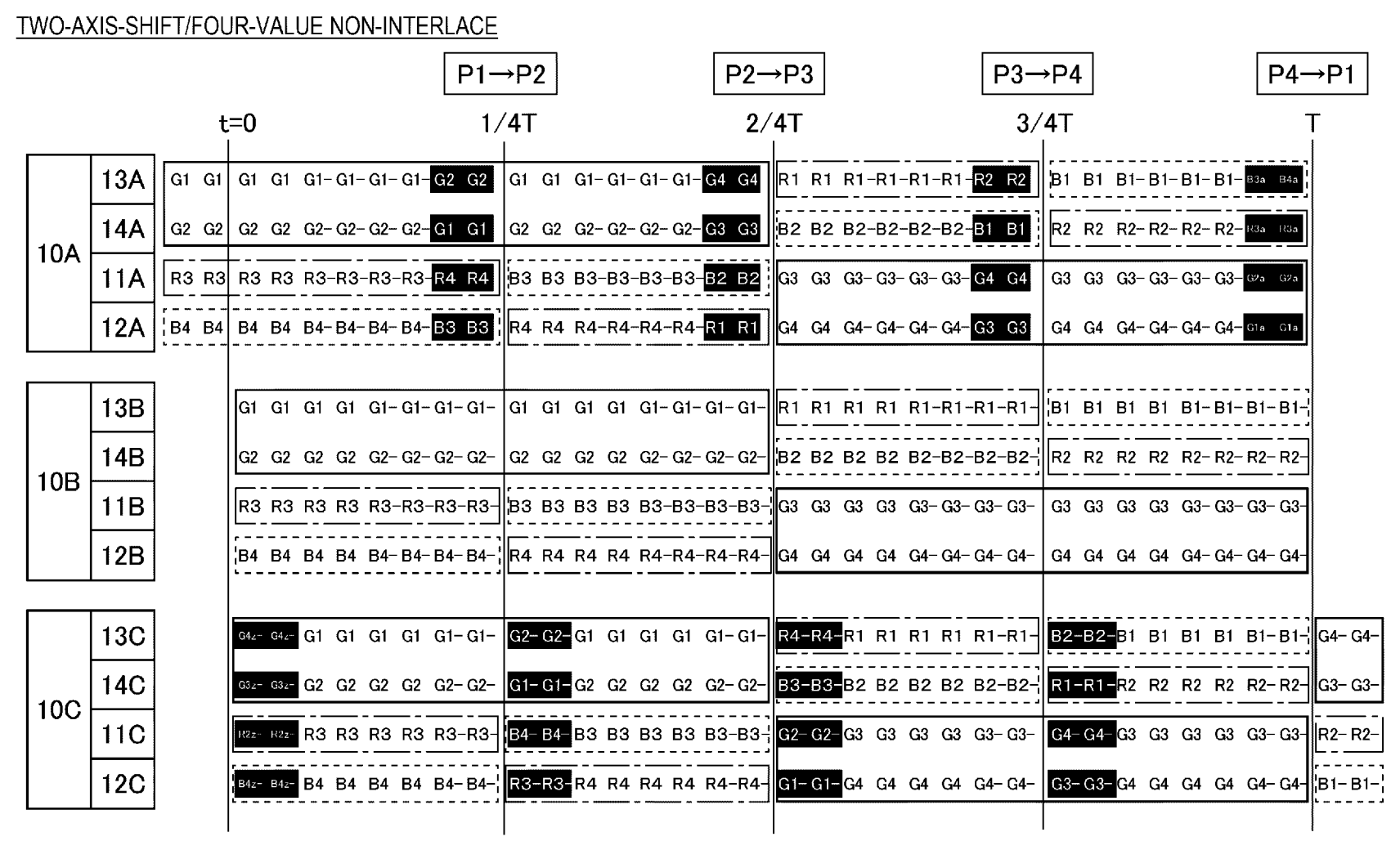

FIG. 6 is a descriptive diagram showing the distribution of the locations where the asynchronization occurs in Comparative Example 1. Comparative Example 1 differs from the first embodiment only in that the liquid crystal panel 40 is driven based on the non-interlace method (progressive method) instead of the interlace method. As a result, no asynchronization occurs in the pixel position 10B at the center, and the locations where the asynchronization occurs concentrate in the pixel position 10A at the upper end and the pixel position 10C at the lower end, as shown in FIG. 6.

Further, not only the asynchronization distribution, but the frequency of the asynchronization is lower in the first embodiment than in Comparative Example 1. For example, the number of locations where the asynchronization occurs is 64 in the distribution in Comparative Example 1 shown in FIG. 6, whereas the number of locations where the asynchronization occurs is reduced to 48 in the distribution in the first embodiment shown in FIG. 5.

Primary Operational Effects of First Embodiment

As described above, the optical module 2 according to the first embodiment includes the light modulator 4, which modulates light incident thereon on a pixel basis, and the pixel shift mechanism 5, and the light modulator 4 is driven based on the interlace method. The pixels 10 of the light modulator 4 each include the first sub-pixel 11, on which the first color light flux (R light) or the second color light flux (B light) is incident, and the second sub-pixel 12, on which the color light flux different from the color light flux incident on the first sub-pixel 11 out of the first color light flux (R light) and the second color light flux (B light) is incident. The pixels 10 each further include the third sub-pixel 13 and the fourth sub-pixel 14, on which the third color light flux (G light) is incident, and the third sub-pixel 13 and the fourth sub-pixel 14 are arranged in the first direction F1, which is the scan direction in which the light modulator 4 scans the pixels to be rewritten. The pixel shift mechanism 5 shifts the position on which the video image light L modulated by the light modulator 4 is incident in the second direction F2, which intersects with the first direction F1 which is the scan direction.

In the method for controlling the optical module 2 according to the first embodiment, when the pixels 10 of the light modulator 4 each include the first sub-pixel 11, on which the first color light flux (R light) or the second color light flux (B light) is incident, the second sub-pixel 12, on which the color light flux different from the color light flux incident on the first sub-pixel 11 out of the first color light flux (R light) and the second color light flux (B light) is incident, and the third sub-pixel 13 and the fourth sub-pixel 14, on which the third color light flux (G light) is incident, the light modulator 4 is driven based on the interlace method with the scan direction being the first direction F1, in which the third sub-pixel 13 and the fourth sub-pixel 14 are arranged, and the position on which the video image light L modulated by the light modulator 4 is incident is shifted in the second direction F2, which intersects with the first direction F1 which is the scan direction.

As described above, in the first embodiment, the two-direction pixel shift including the pixel shift in a direction (second direction F2) that intersects the first direction F1, which is the direction in which the sub-pixels on which the G light is incident are arranged, is performed. Therefore, switching the content displayed at a sub-pixel to another in synchronization with the shift operation allows all the color light fluxes, the R light, the G light, and the B light, to be projected on the screen 100 in the areas where the pixel interval is half the pixel interval Aλ, which is the product of the pixel interval λ in the liquid crystal panel 40 and the projection magnification A, in a time division manner in the one-frame display period. The resolution in the first direction F1 and the resolution in the second direction F2 can therefore be apparently doubled. A high-resolution image can therefore be displayed.

Further, in the first embodiment, in which the liquid crystal panel 40 is driven based on the interlace method, the locations where the asynchronization between the pixel shift and data in accordance with which the sub-pixels are written occurs are distributed across the screen. Since occurrence of in-plane unevenness is therefore be suppressed, quasi-resolution can be improved, whereby the display quality can be improved.

Further, in the first embodiment, the third color light flux is the G light (green light), and the sub-pixels on which the G light is incident (third sub-pixel 13 and fourth sub-pixel 14) are arranged in the first direction F1, which coincides with the scan direction of the liquid crystal panel 40. Since the row of the sub-pixels on which the G light is incident (third sub-pixel 13 and fourth sub-pixel 14) and the sub-pixels on which the R light and the B light are incident (first sub-pixel 11 and second sub-pixel 12) are alternately arranged in the display area of the liquid crystal panel 40, driving the liquid crystal panel 40 in the interlace method allows the writing of the sub-pixels on which the G light is incident to be completed in the first half of the one-frame rewriting process. The asynchronization at the sub-pixels on which the G light is incident is therefore unlikely to occur. The G light (green light) is a color light flux to which a human eye has large visual sensitivity and which greatly contributes to the brightness of an image and quasi-resolution as compared with the R light (red light) and the B light (blue light). Light having a wavelength of 555 nm, which is a yellowish green color light flux, is the brightest color light flux. In the first embodiment, light having the wavelength that provides the largest brightness (555 nm), for example, a color light flux having wavelengths ranging from 500 to 600 nm is used as the G light (green light). Further, a color light flux that belongs to a wavelength band ranging from 610 to 750 nm can, for example, be used as the R light (red light), and a color light flux that belongs to a wavelength band ranging from 430 to 460 nm can, for example, be used as the B light (blue light). Reducing the asynchronization that occurs at the sub-pixels on which the G light (green light) is incident allows stabilization of display operation using the G light. A decrease in the brightness due to the asynchronization can thus be suppressed. The quasi-resolution can therefore be increased, whereby the display quality can be improved.

In the first embodiment, when the scan direction of the light modulator 4 is the first direction F1, the third sub-pixel 13 and the fourth sub-pixel 14 are arranged in the first direction F1, as described above. The first sub-pixel 11 and the second sub-pixel 12 are arranged in the first direction F1 in positions different in the second direction F2, which intersects the first direction F1, from the positions of the third sub-pixel 13 and the fourth sub-pixel 14. That is, when one of the first direction F1 and the second direction F2 is the row direction, and the other is the column direction, the first sub-pixel 11, the second sub-pixel 12, the third sub-pixel 13, and the fourth sub-pixel 14 are arranged in a matrix formed of two rows and two columns. Performing the pixel shift in the first direction F1 and the second direction F2 therefore allows the R light, the G light, and the B light to be projected on the four areas arranged in the form of a lattice on the projection surface in a time division manner so that the four areas are displayed as if they were apparently independent pixels, whereby the resolution in the first direction F1 and the second direction F2 can be doubled.

Second Embodiment

In the first embodiment, the pixel shift is so performed that the shift operation is performed in two directions and the number of shift positions is four, but the pixel shirt method is not limited to the method in the first embodiment. The optical module 2 according to a second embodiment performs pixel shift in which the shift operation is performed in one direction and the number of shift positions is two (hereinafter, one-axis-shift/two-value pixel shift). Portions different from those in the first embodiment will be described below, and common portions will not be described.

Figure 7:
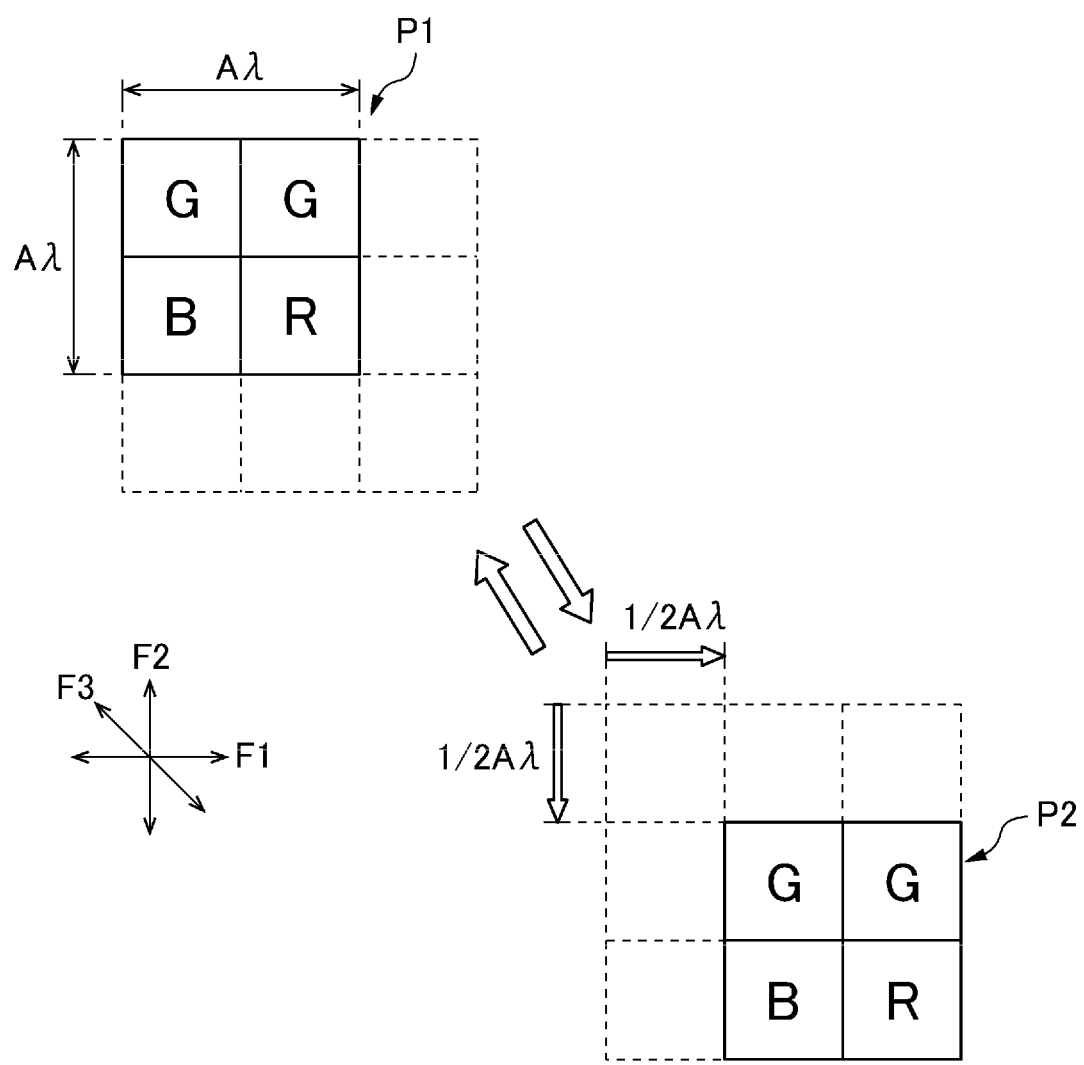
FIG. 7 is a state transition diagram showing pixel shift in a second embodiment.

FIG. 7 is a state transition diagram showing the pixel shift in the second embodiment. In the second embodiment, the pixel shift mechanism 5 shifts the optical path of the video image light L in a third direction F3, which is the diagonal direction of each of the pixels 10. The color light fluxes modulated by the pixels 10 are sequentially projected in the first shift position P1 and the second shift position P2 on the screen 100 in accordance with the pixel shift in the third direction F3. The second shift position P2 is the position shifted from the first shift position P1 by ½Aλ both in the first direction F1 and the second direction F2. Data at the first sub-pixel 11, the second sub-pixel 12, the third sub-pixel 13, and the fourth sub-pixel 14 are rewritten in synchronization with the pixel shift described above for an apparent increase in the resolution of an image displayed on the screen 100.

Figure 8:
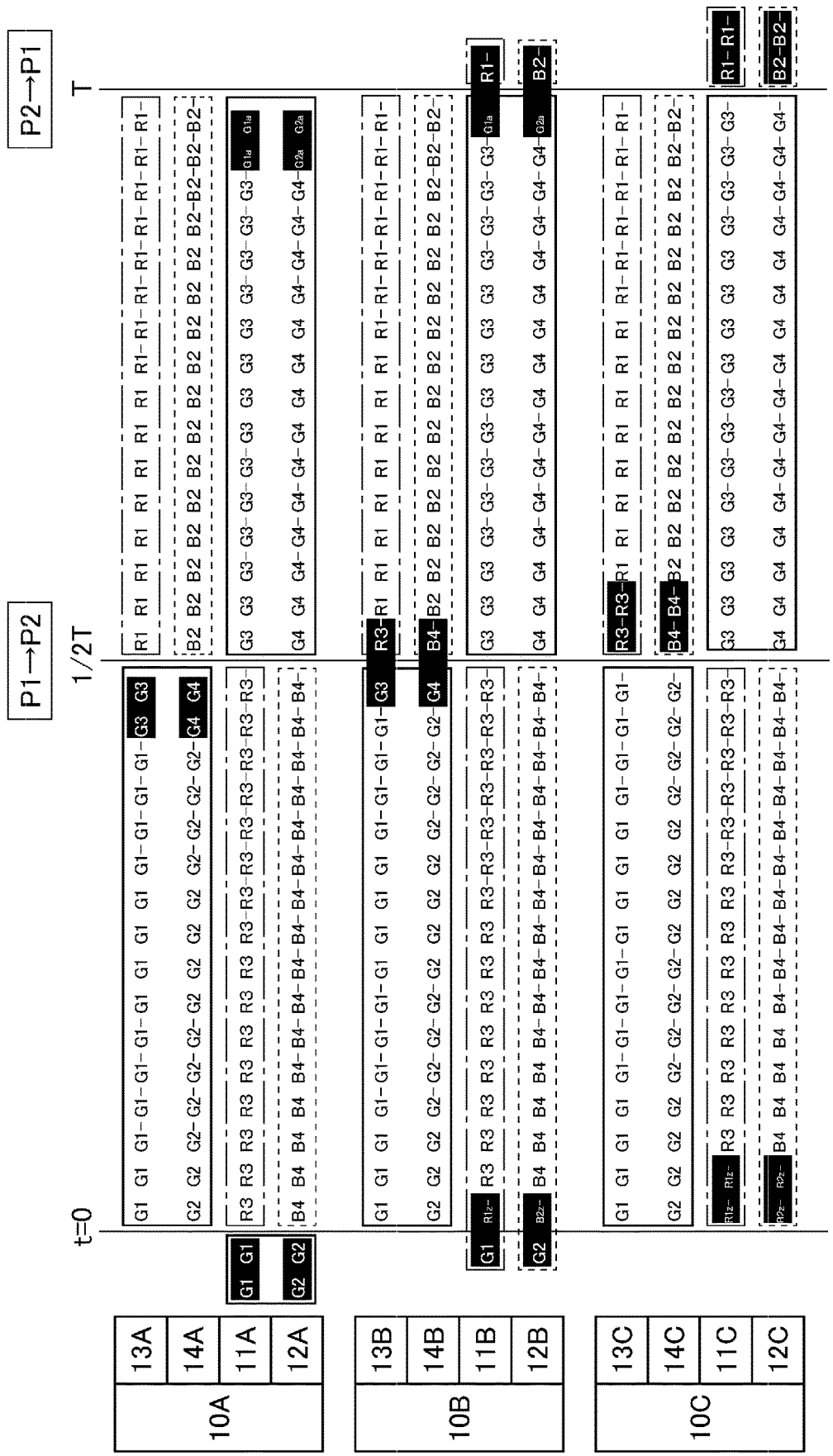
FIG. 8 is a descriptive diagram showing the distribution of the locations where the asynchronization occurs in the second embodiment.

FIG. 8 is a descriptive diagram showing the distribution of the locations where the asynchronization occurs in the second embodiment. In the second embodiment, the liquid crystal pane 40 is driven based on the interlace method, as in the first embodiment. As a result, in the case of the G-light sub-pixel positions, where the display contents are rewritten in the first half of the one-frame rewriting process, the locations where the asynchronization occurs are distributed in the G-light sub-pixel positions in the pixel position 10A at the upper end and the pixel position 10B at the center, as in the first embodiment. In the case of the R-light sub-pixel positions and the B-light sub-pixel positions, where the display contents are rewritten in the second half of the one-frame rewriting process, the locations where the asynchronization occurs are distributed in the R-light sub-pixel positions and the B-light sub-pixel positions in the pixel position 10C at the lower end and the pixel position 10B at the center.

Figure 9:
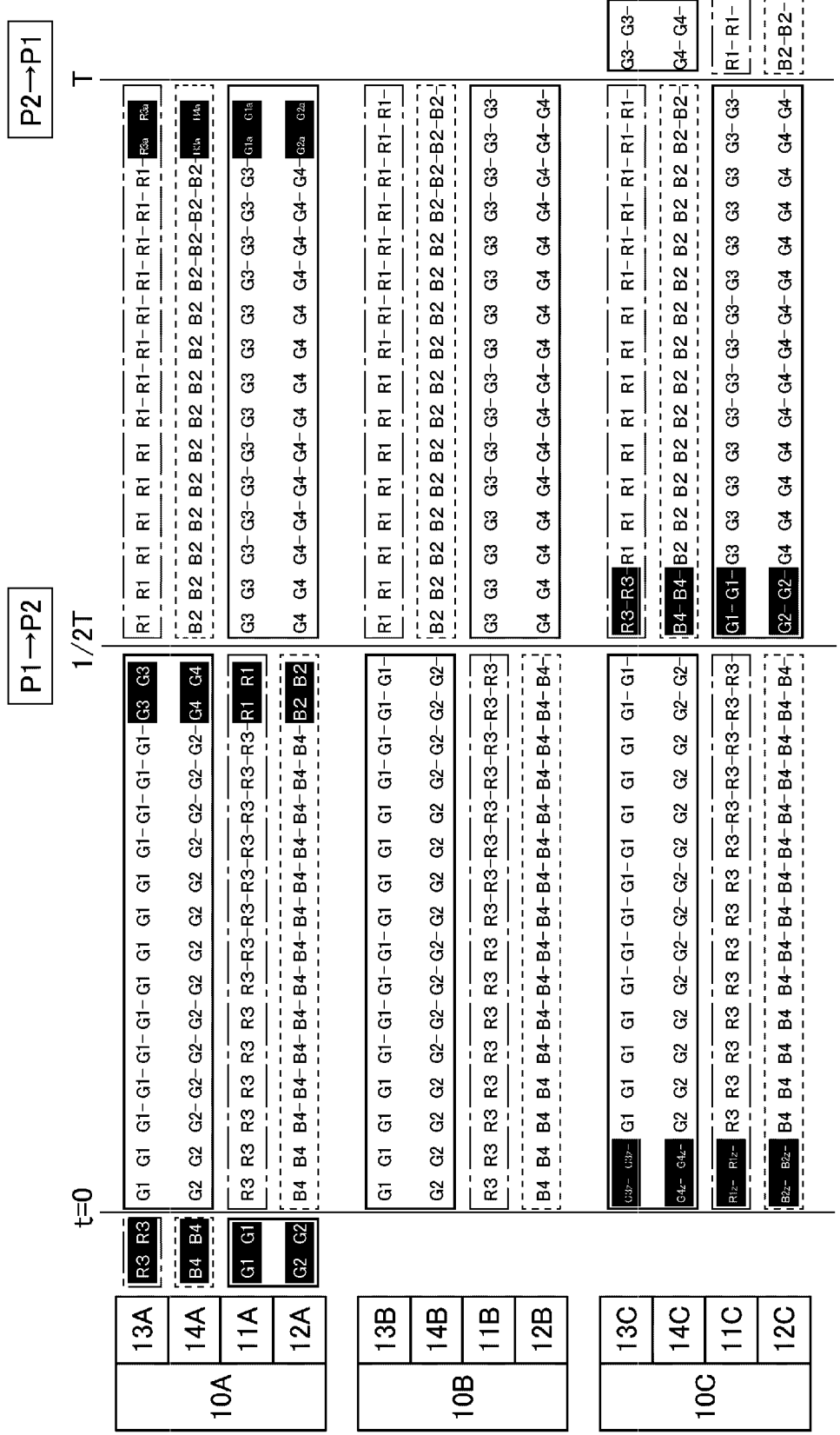
FIG. 9 is a descriptive diagram showing the distribution of the locations where the asynchronization occurs in Comparative Example 2.

FIG. 9 is a descriptive diagram showing the distribution of the locations where the asynchronization occurs in Comparative Example 2. Comparative Example 2 differs from the second embodiment only in that the liquid crystal panel 40 is driven based on the non-interlace method (progressive method) instead of the interlace method. As a result, no asynchronization occurs in the pixel position 10B at the center, and the locations where the asynchronization occurs concentrate in the pixel position 10A at the upper end and the pixel position 10C at the lower end, as shown in FIG. 9.

Further, not only the asynchronization distribution, but the frequency of the asynchronization is lower in the second embodiment than in Comparative Example 2. For example, the number of locations where the asynchronization occurs is 32 in the distribution in Comparative Example 2 shown in FIG. 9, whereas the number of locations where the asynchronization occurs is reduced to 24 in the distribution in the second embodiment shown in FIG. 8.

Primary Operational Effects of Second Embodiment

In the second embodiment, in which the one-axis-shift/two-value pixel shift is performed, switching the contents displayed at the sub-pixels in synchronization with the shift operation allows a displayed image to have apparently high resolution resulting from a pixel interval smaller than the pixel interval Aλ on the screen 100, which is the production of the pixel interval λ in the liquid crystal panel 40 and the projection magnification A.

Further, also in the second embodiment, in which the liquid crystal panel 40 is driven based on the interlace method, the locations where the asynchronization between the pixel shift and data in accordance with which the sub-pixels are written occurs are distributed across the screen, as in the first embodiment. Since occurrence of in-plane unevenness is therefore be suppressed, quasi-resolution can be improved, whereby the display quality can be improved.

Third Embodiment

The optical module 2 according to a third embodiment combines one-direction pixel shift with a swap of the R light and the B light incident on the corresponding sub-pixels to perform pixel shift that allows transitions to four state types (hereinafter, referred to as one-axis shift four-value+RB swap) for an increase in resolution of a displayed image.

Figure 10:
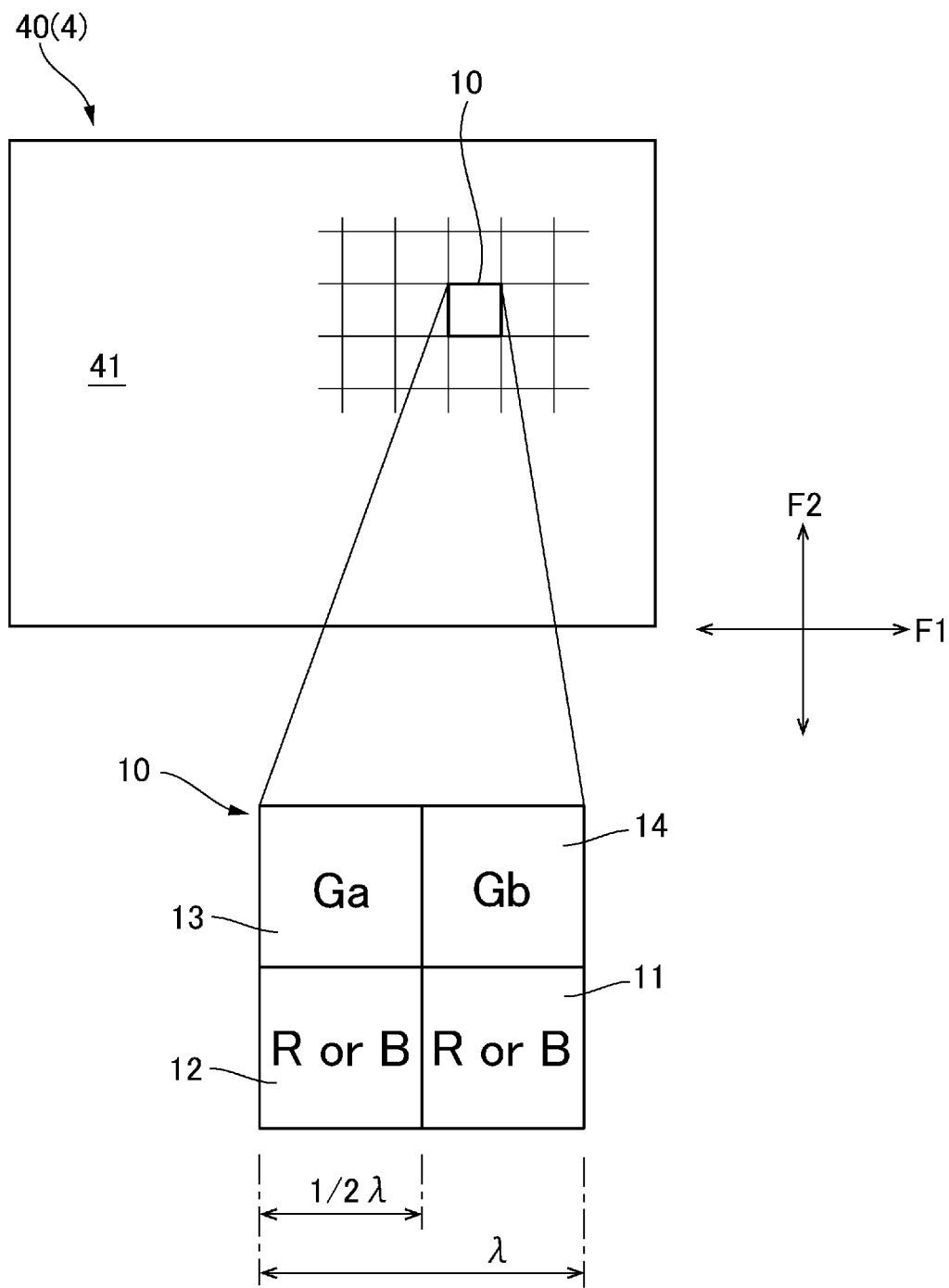
FIG. 10 is a descriptive diagram diagrammatically showing the planar configuration of a liquid crystal panel and pixels thereof in a third embodiment.

FIG. 10 is a descriptive diagram diagrammatically showing the planar configuration of the liquid crystal panel 40 and the pixels 10 in the third embodiment. In the third embodiment, one of the R light and the B light is incident on the first sub-pixel 11. Out of the R light and the B light, the color light flux different from the color light flux incident on the first sub-pixel 11 is incident on the second sub-pixel 12. For example, the R light is incident on the first sub-pixel 11, and the B light is incident on the second sub-pixel 12. Instead, the B light is incident on the first sub-pixel 11, and the R light is incident on the second sub-pixel 12. The G light is incident on the third sub-pixel 13 and the fourth sub-pixel 14. The G light incident on the third sub-pixel 13 is called Ga light, and the G light incident on the fourth sub-pixel 14 is called Gb light, as shown in FIG. 10.

Figure 11:
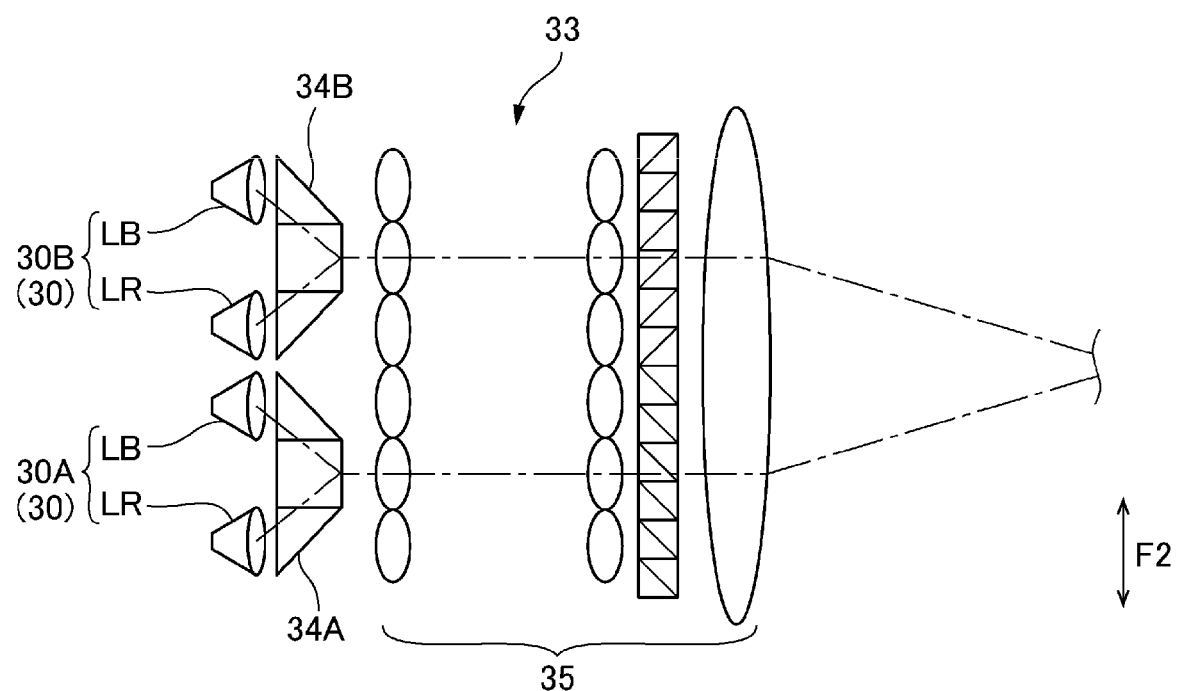
FIG. 11 is descriptive diagram diagrammatically showing part of a light source and a light incident position swapping mechanism in an optical module according to the third embodiment.

FIG. 11 is descriptive diagram diagrammatically showing part of the light source 30 and a light incident position swapping mechanism 33 in the optical module 2 according to the third embodiment. In the third embodiment, the optical system 31 includes the light incident position swapping mechanism 33, which swaps the R light incident position and the B light incident position. In the light source section 3 in the third embodiment, the light incident position swapping mechanism 33 swaps the R light and the B light and causes the R light and the B light to be alternately incident on the first sub-pixel 11 and the second sub-pixel 12, which are part of each of the pixels 10.

The light source 30 in the third embodiment includes a first light source 30A and a second light source 30B, as shown in FIG. 11. In FIG. 11, a light source that outputs the G light is omitted. The first light source 30A and the second light source 30B each include one laser light source LR for R light and one laser light source LB for B light. The first light source 30A and the second light source 30B are each so turn-on/off controlled that only one of the laser light source LR for R light and the laser light source LB for B light outputs light. The first light source 30A and the second light source 30B are so synchronously controlled that the turned-on laser light sources output color light fluxes different from each other.

The light incident position swapping mechanism 33 includes a first optical element 34A, a second optical element 34B, and a third optical element 35. The R light and the B light outputted from the first light source 30A enter the first optical element 34A. The R light and the B light outputted from the second light source 30B enter the second optical element 34B. The light fluxes having exited out of the first optical element 34A and the second optical element 34B enter the third optical element 35. The first optical element 34A outputs the incident R light and B light along the same optical path. The second optical element 34B also outputs the incident R light and B light along the same optical path.

The color light fluxes that exit out of the first optical element 34A and the second optical element 34B and enter the third optical element 35 enters the microlens array from the third optical element 35. The color light flux from the first optical element 34A is incident on the first sub-pixel 11 via the microlens array. The color light flux from the second optical element 34B is incident on the second sub-pixel 12 via the microlens array. The turn-on/off control of the laser light source LR for R light and the laser light source LB for B light in the first light source 30A and the second light source 30B can therefore swaps the R light and the B light and cause the R light and the B light to be alternately incident on the first sub-pixel 11 and the second sub-pixel 12.

The pixel shift mechanism 5 in the third embodiment shifts the optical path of the video image light L in the second direction F2, which is the direction intersects the direction in which the third sub-pixel 13 and the fourth sub-pixel 14 on which the G light is incident are arranged. That is, the pixel shift mechanism 5 shifts the optical path of the video image light L in the second direction F2, which intersects the first direction F1 which is the scan direction of the liquid crystal panel 40.

Figure 12:
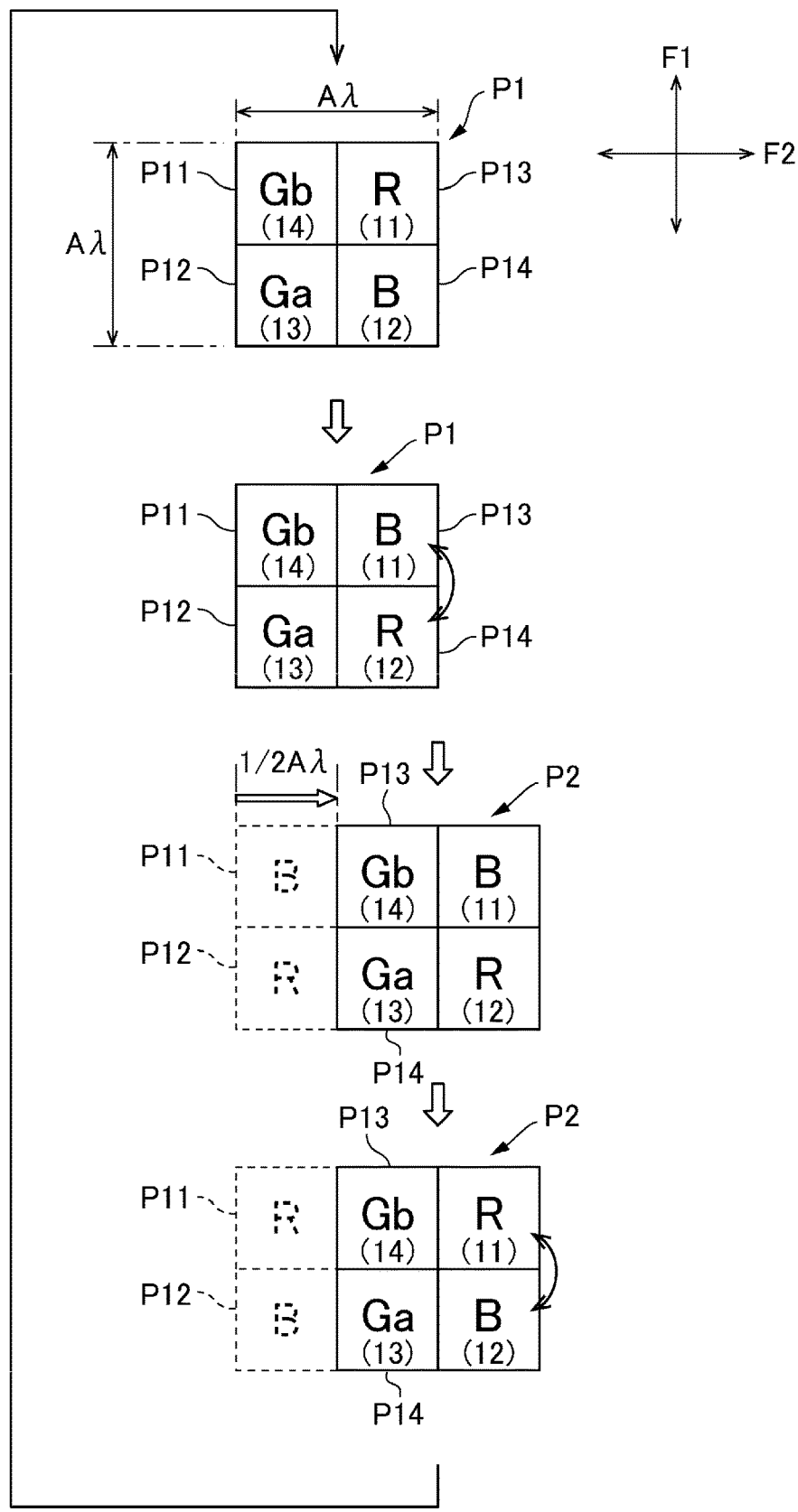
FIG. 12 is a state transition diagram showing pixel shift and color light flux swap in the third embodiment.

FIG. 12 is a state transition diagram showing the pixel shift and the color light flux swap in the third embodiment. The first shift position P1 and the second shift position P2 shown in FIG. 12 are the on-projection-surface positions where the video image light L is projected and are, in the present embodiment, positions on the screen 100 that are the positions where the light fluxes modulated by the pixels 10 are projected. As shown in FIG. 10, the pixel interval on the screen 100 is Aλ, where the pixel interval in the liquid crystal panel 40 is λ, and the projection magnification in the projection on the screen 100 is A. As shown in FIG. 12, the light fluxes modulated by the sub-pixels of each of the pixels 10 of the liquid crystal panel 40 are projected for a fixed period alternately on the first shift position P1 and the second shift position P2, which is shifted from the first shift position P1 in the first direction F1 by half the pixel interval Aλ on the screen 100. The first shift position P1 includes a first position P11, a second position P12, a third position P13, and a fourth position P14, on which the light fluxes modulated by the corresponding sub-pixels are incident. The first position P11 to the fourth position P14 are each one of four regions to which the first shift position P1 is divided.

The pixel shift mechanism transitions to a first state in which the video image light L travels along a first optical path along which the light flux modulated by the third sub-pixel 13 is incident on the first position P11 and the light flux modulated by the fourth sub-pixel 14 is incident on the second position P12 or a second state in which the video image light L travels along a second optical path along which the light flux modulated by the third sub-pixel 13 is incident on the third position P13 and the light flux modulated by the fourth sub-pixel 14 is incident on the fourth position P14.

The light source section 3 causes the G light (Ga light or Gb light) to be incident on the third sub-pixel 13 and the fourth sub-pixel 14 both in the first and second states. That is, the light fluxes incident on the third sub-pixel 13 and the fourth sub-pixel 14 do not change during one frame. On the other hand, the R light and the B light are swapped during the first state and incident on the first sub-pixel 11 and the second sub-pixel 12. Similarly, the R light and the B light are swapped during the second state and incident on the first sub-pixel 11 and the second sub-pixel 12.

That is, the light source section 3 causes the R light and then the B light to be incident on the first sub-pixel 11 and the B light and then the R light to be incident on the second sub-pixel 12 during the period for which the image shift mechanism 5 operates in the first state. The light source section 3 causes the B light and then the R light to be incident on the first sub-pixel 11 and the R light and then the B light to be incident on the second sub-pixel 12 during the period for which the image shift mechanism 5 operates in the second state.

In the third embodiment, the pixel shift in the first direction F1 and the swap of the R light and the B light to be incident on the sub-pixels arranged in the second direction F2 are performed in the same cycle and shifted by a predetermined period (period that is half the cycle of the pixel shift, for example). As a result, all the color light fluxes, the R light, the B light, the Ga light, and the Gb light, are projected in a time division manner in the first position P11, the second position P12, the third position P13, and the fourth position P14. That is, the three color light fluxes are projected in a time division manner on the first position P11 in the following order: Gb light→Gb light→B light→R light, and the three color light fluxes are projected in a time division manner on the second position P12 in the following order: Ga light→Ga light→R light→B light. The three color light fluxes are projected in a time division manner on the third position P13 in the following order: R light→B light→Gb light→Gb light, and the three color light fluxes are projected in a time division manner on the fourth position P14 in the following order: B light→R light→Ga light→Ga light.

Therefore, in the third embodiment, the modulated R light, B light, and G light (Ga light or Gb light) can be projected in a time division manner in the one-frame display period on all the first position P11, the second position P12, the third position P13, and the fourth position P14. Therefore, since the four regions can be displayed based on the superposition of the R light, the B light, and the G light on one another as if the four regions were independent pixels, the resolution in the first direction F1 and the second direction F2 can be apparently doubled. A high-resolution image can therefore be displayed.

Figure 13:
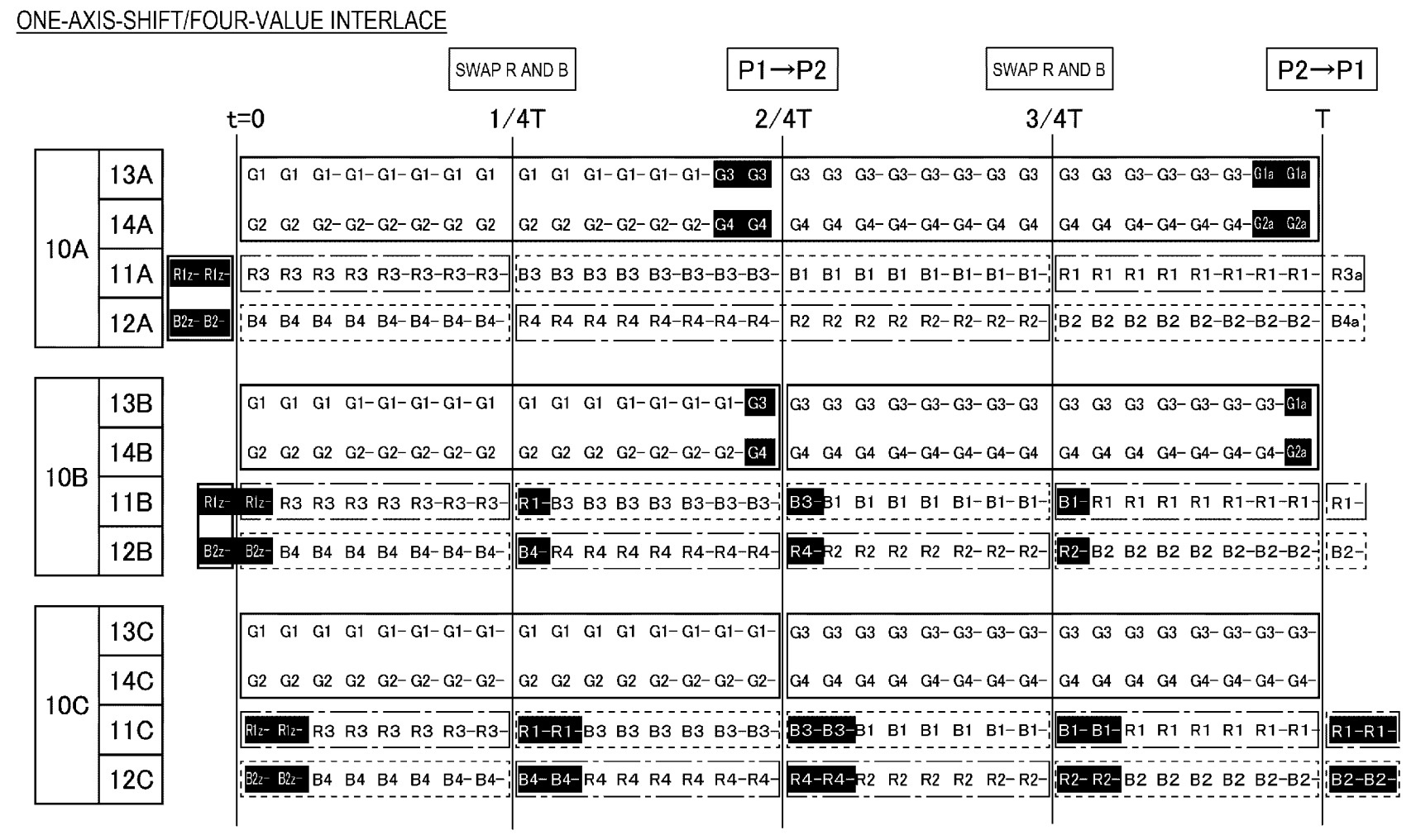

FIG. 13 is a descriptive diagram showing the distribution of the locations where the asynchronization occurs in the third embodiment. In the third embodiment, the liquid crystal panel 40 is driven based on the interlace method, as in the first and second embodiments. As a result, in the case of the G-light sub-pixel positions, where the display contents are rewritten in the first half of the one-frame rewriting process, the locations where the asynchronization occurs are distributed in the G-light sub-pixel positions in the pixel position 10A at the upper end and the pixel position 10B at the center, as in the first and second embodiments. In the case of the R-light sub-pixel positions and the B-light sub-pixel positions, where the display contents are rewritten in the second half of the one-frame rewriting process, the locations where the asynchronization occurs are distributed in the R-light sub-pixel positions and the B-light sub-pixel positions in the pixel position 10C at the lower end and the pixel position 10B at the center.

Figure 14:
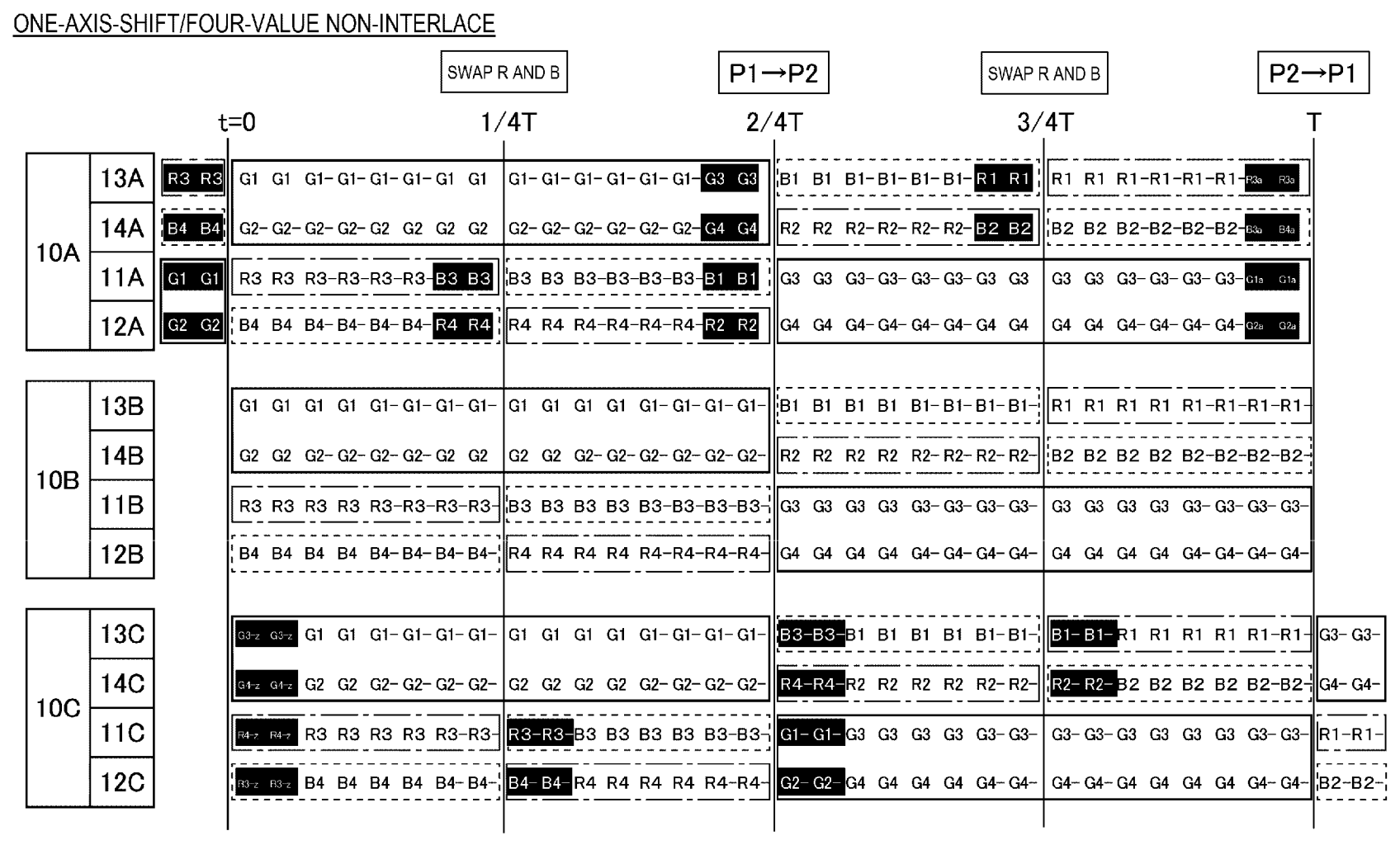

FIG. 14 is a descriptive diagram showing the distribution of the locations where the asynchronization occurs in Comparative Example 3. Comparative Example 3 differs from the third embodiment only in that the liquid crystal panel 40 is driven based on the non-interlace method (progressive method) instead of the interlace method. As a result, no asynchronization occurs in the pixel position 10B at the center, and the locations where the asynchronization occurs concentrate in the pixel position 10A at the upper end and the pixel position 10C at the lower end, as shown in FIG. 14.

Further, not only the asynchronization distribution, but the frequency of the asynchronization is lower in the third embodiment than in Comparative Example 3. For example, the number of locations where the asynchronization occurs is 48 in the distribution in Comparative Example 3 shown in FIG. 14, whereas the number of locations where the asynchronization occurs is reduced to 36 in the distribution in the third embodiment shown in FIG. 13.

Primary Operational Effects of Third Embodiment

As described above, the optical module 2 according to the third embodiment includes the following configuration in addition to the configuration in the first embodiment. That is, in the optical module 2 according to the third embodiment, the pixel shift mechanism 5 transitions to the first state, in which the light flux modulated by the third sub-pixel 13 is incident on the first position P11 and the light flux modulated by the fourth sub-pixel 14 is incident on the second position P12, or the second state, in which the light flux modulated by the third sub-pixel 13 is incident on the third position P13 and the light flux modulated by the fourth sub-pixel 14 is incident on the fourth position P14. Further, the first color light flux (R light) and then the second color light flux (B light) are incident on the first sub-pixel 11 and the second color light flux (B light) and then the first color light flux (R light) are incident on the second sub-pixel 12 during the period for which the image shift mechanism 5 operates in the first state, and the second color light flux (B light) then the first color light flux (R light) are incident on the first sub-pixel 11 and the first color light flux (R light) and then the second color light flux (B light) are incident on the second sub-pixel 12 during the period for which the image shift mechanism 5 operates in the second state.

As described above, in the third embodiment, the pixel shift in the second direction F2, which intersects the first direction F1 which is the scan direction in which the light modulator 4 scans the pixels to be rewritten, and the swap of the R light and the B light to be incident on the first sub-pixel 11 and the second sub-pixel 12 are performed in the same cycle and shifted from each other by a period shorter than each cycle (period that is half of each cycle, for example). The modulated R light, B light, and G light (Ga light or Gb light) can thus be projected in a time division manner in one frame on the four areas on the screen 100, the first position P11, the second position P12, the third position P13, and the fourth position P14. Therefore, since the four regions can be displayed based on the superposition of the R light, the B light, and the G light (Ga light or Gb light) on one another as if the four regions were independent pixels, the resolution in the first direction F1 and the second direction F2 can be apparently doubled. A high-resolution image can therefore be displayed.

Further, in the third embodiment, in which the liquid crystal panel 40 is driven based on the interlace method, the locations where the asynchronization between the pixel shift and data in accordance with which the sub-pixels are written occurs are distributed across the screen, as in the first and second embodiments. Since occurrence of in-plane unevenness is therefore be suppressed, quasi-resolution can be improved, whereby the display quality can be improved.

In the third embodiment, the pixel shift is so performed that the shift operation is performed in one direction and the number of shift positions is two. The number of shift positions is therefore smaller, so that the frequency of the pixel shift is lower than in the case where the pixel shift in two directions allows movement through four shift positions to increase the resolution. Therefore, since the frequency at which the contents displayed at the sub-pixels are switched in synchronization with the pixel shift decreases, which means a small proportion of the period for which the asynchronization between the contents displayed at the sub-pixels and a shift position occurs due to a delay of the liquid crystal response time. The increase in the resolution can therefore improve the display quality.

In the liquid crystal panel 40, which sequentially drives the pixels 10 arranged in the display area 41, it takes a time period corresponding to a reciprocal of the frame frequency to drive the pixels 10 from one end to the other end of the display area 41, so that an in-plane time difference occurs, which could result in the asynchronization between the contents displayed at the sub-pixels that allow time-division display operation and a shift position. On the other hand, the frequency at which the contents displayed at the sub-pixels are switched in synchronization with the pixel shift is small in the third embodiment, as described above, which means a small proportion of the period for which the asynchronization between the contents displayed at the sub-pixels and a shift position occurs due to the in-plane time difference that accompanies the operation of driving the liquid crystal material for sequential writing. The increase in the resolution can therefore improve the display quality even when a low-response-speed liquid crystal material is used.

Further, in the third embodiment, in which a mechanism independent of the pixel shift mechanism 5 swaps the color light fluxes, the timing at which the color light fluxes are swapped is readily adjusted. The contents displayed at the first sub-pixel 11 and the second sub-pixel 12 are therefore readily synchronized with a shift position, so that a decrease in the display quality due to the asynchronization is unlikely to occur.

Moreover, in the third embodiment, in which the optical path of the B light (blue light), which has a short wavelength that is most likely to cause degradation of the liquid crystal material out of the three color light fluxes, is replaced with the optical path of each of the other color light fluxes, continuous irradiation of a specific sub-pixel with the B light (blue light) can be suppressed. Degradation of the liquid crystal material can therefore be suppressed.

In the third embodiment, when the scan direction of the light modulator 4 is the first direction F1, the third sub-pixel 13 and the fourth sub-pixel 14 are arranged in the first direction F1, as in the first embodiment. The first sub-pixel 11 and the second sub-pixel 12 are arranged in the first direction F1 in positions different in the second direction F2, which intersects the first direction F1, from the positions of the third sub-pixel 13 and the fourth sub-pixel 14. Further, when one of the first direction F1 and the second direction F2 is the row direction, and the other is the column direction, the first sub-pixel 11, the second sub-pixel 12, the third sub-pixel 13, and the fourth sub-pixel 14 are arranged in a matrix formed of two rows and two columns. Performing the pixel shift in the first direction F1 and the second direction F2 therefore allows the R light, the G light, and the B light to be projected on the four areas arranged in the form of a lattice on the projection surface in a time division manner so that the four areas can be displayed as if they were apparently independent pixels. The resolution in the first direction F1 and the second direction F2 can therefore be doubled.

The optical modules 2 according to the first to third embodiments can each be used in a projection-type display apparatus, such as the projector 1 including the projection optical system 6, which enlarges and projects the video image light L incident from the optical module 2. The resolution of an image projected on the screen 100 can thus be increased. Further, the locations where the asynchronization between the pixel shift and data in accordance with which the sub-pixels are written occurs are distributed across the screen. Since occurrence of in-plane unevenness is therefore be suppressed, quasi-resolution of an image projected on the screen 100 can be improved, whereby the display quality can be improved.

Variations (1) The shift direction in which the pixel shift is performed is not limited to the directions in the embodiments described above. In the second and third embodiments, the pixel shift is performed in one direction, but the shift direction only needs to be a direction that intersects the direction in which the sub-pixels on which the G light is incident are arranged (first direction F1). For example, the shift direction may be the second direction F2 or the third direction F3 which is the diagonal direction of each of the pixels 10.

(2) The mechanism that swaps the R light and the B light does not necessarily have the configuration in the third embodiment. For example, the optical paths of the R light and the B light may be swapped by rotating a retardation film to cause one of the R light and the B light to be selectively incident on the retardation film and using a reflective polarizer to change the optical path of the color light flux having passed through the retardation film.

What is claimed is:

1. An optical module comprising:
   a light modulator that modulates light and includes a plurality of pixels; and
   a pixel shift mechanism,
   wherein the light modulator is driven based on an interlace method,
   the pixels of the light modulator each include a first sub-pixel on which a first color light flux or a second color light flux is incident, a second sub-pixel on which a color light flux different from the color light flux incident on the first sub-pixel out of the first color light flux and the second color light flux is incident, and a third sub-pixel and a fourth sub-pixel on which a third color light flux is incident,
   the third sub-pixel and the fourth sub-pixel are arranged in a scan direction of the light modulator, and
   the pixel shift mechanism shifts the light modulator in a direction that intersects the scan direction.

2. The optical module according to claim 1, wherein the third color light flux is green light.

3. The optical module according to claim 1,
   wherein the pixel shift mechanism transitions to
   a first state in which the third sub-pixel is located on a first position and the fourth sub-pixel is located on a second position, or
   a second state in which the third sub-pixel is located on a third position and the fourth sub-pixel is located on a fourth position,
   the first light and then the second light are incident on the first sub-pixel and the second light and then the first light are incident on the second sub-pixel during a period for which the image shift mechanism operates in the first state, and
   the second light and then the first light are incident on the first sub-pixel and the first light and then the second light are incident on the second sub-pixel during a period for which the image shift mechanism operates in the second state.

4. The optical module according to claim 1,
   wherein the scan direction of the light modulator is a first direction, and
   the first sub-pixel and the second sub-pixel are arranged in the first direction in positions different in a second direction that intersects the first direction from positions of the third sub-pixel and the fourth sub-pixel.

5. The optical module according to claim 4,
wherein the first sub-pixel, the second sub-pixel, the third sub-pixel, and the fourth sub-pixel are arranged in a matrix formed of two rows and two columns.

6. A projection-type display apparatus comprising:
the optical module according to claim 1; and
a projection optical system that enlarges and projects video image light incident from the optical module.

7. A projection-type display apparatus comprising:
the optical module according to claim 2; and
a projection optical system that enlarges and projects video image light incident from the optical module.

8. A projection-type display apparatus comprising:
the optical module according to claim 3; and
a projection optical system that enlarges and projects video image light incident from the optical module.

9. A projection-type display apparatus comprising:
the optical module according to claim 4; and
a projection optical system that enlarges and projects video image light incident from the optical module.

10. A projection-type display apparatus comprising:
the optical module according to claim 5; and
a projection optical system that enlarges and projects video image light incident from the optical module.

11. A method for controlling an optical module including a light modulator and a pixel shift mechanism,
the light modulator modulating light and including a plurality of pixels,
the pixels of the light modulator each including a first sub-pixel on which a first color light flux or a second color light flux is incident, a second sub-pixel on which a color light flux different from the color light flux incident on the first sub-pixel out of the first color light flux and the second color light flux is incident, and a third sub-pixel and a fourth sub-pixel on which a third color light flux is incident,
the method comprising:
driving the light modulator based on an interlace method with a direction in which the third sub-pixel and the fourth sub-pixel are arranged being a scan direction; and
shifting the light modulator in a direction that intersects the scan direction.

* * * * *